United States Patent [19]

Evers et al.

[11] 3,940,466

[45] *Feb. 24, 1976

[54] METHOD OF PROVIDING A STRUCTURAL SHAPE

[75] Inventors: King W. Evers, Livermore, Calif.; George H. Larsen, Las Vegas, Nev.

[73] Assignees: King W. Evers, Livermore, Calif.; George H. Larsen, Las Vegas, Nev.

[*] Notice: The portion of the term of the patent subsequent to May 29, 1990 has been disclaimed.

[22] Filed: Dec. 7, 1973

[21] Appl. No.: 422,771

[52] U.S. Cl. ............... 264/45.3; 264/115; 264/122; 264/DIG. 17
[51] Int. Cl.² ........................................... B29G 7/00
[58] Field of Search ........... 264/115, 121, 122, 112, 264/DIG. 6, DIG. 7, DIG. 17, 45.3; 428/182

[56] References Cited
UNITED STATES PATENTS

| | | | |
|---|---|---|---|
| 3,235,530 | 2/1966 | Crouch et al. | 161/168 |
| 3,736,221 | 5/1973 | Evers et al. | 161/170 |

Primary Examiner—Robert F. White
Assistant Examiner—J. R. Hall
Attorney, Agent, or Firm—Lothrop & West

[57] ABSTRACT

A method of providing a structural shape includes starting with waste paper and treating the waste paper in a hammer mill to produce paper fibers. The fibers are put through a screen. The screened fibers are mixed with a binder such as a thermosetting epoxy foaming resin or with a phenolic resin in water in preferred proportions. The water or other solvent is kept to a very small value to provide a relatively dry process. The mixture is then pressed in a geometrical shape under substantial pressure (3 to 600 psi). The pressed mixture is then baked or cured at an elevated temperature (175°F to 375°F) for a predetermined time (three minutes to three hours).

4 Claims, No Drawings

METHOD OF PROVIDING A STRUCTURAL SHAPE

In our U.S. Pat. No. 3,736,221 issued May 29, 1973 entitled "Structural Shape Based On Waste Paper And Method Of Providing The Same", we disclose an arrangement for reclaiming or recycling waste paper in a fashion involving substantial liquid to produce structural shapes such as building materials and blocks.

While the product and method set forth in that patent have proved generally quite satisfactory, it is still an object of our invention to improve the process and the product, to reduce the time and effort required in manufacture and to afford an at least equally satisfactory result.

It is therefore an object of this invention to improve upon the method set forth in our mentioned patent.

Another object of the invention is to provide a method that can be carried out more expeditiously and easier than the method set forth in the patent and especially with much less liquid involved.

Another object of the invention is to provide a method for producing a product that is at least equally easy to handle and equally effective in use, but that is somewhat more economical to manufacture and more quickly available for use.

Other objects, together with the foregoing, are attained in the practice of the method and the provision of the product in accordance with the following description.

Just as in the mentioned patent, our starting material herein is a dry waste paper such as is normally available from waste paper dealers and the like and may include fiberboard, used newspaper, scrap bond paper, rag content paper and the like.

As a first operation, waste paper of the indicated sort is put into a hammer mill and is treated by the hammer mill for a time sufficient to reduce the dry paper substantially to a mass of individual, although perhaps intertwined, paper fibers. Under the microscope such fibers are readily discerned as individual strands. Some stand freely yet some of them are intertwined and interlaced at random and partake of a matte or felt-like consistency. It is convenient to subject the waste paper to the action of the hammer mill for a few seconds at a relatively high rate of peripheral speed of the mill; say 6000 feet per minute, the time ordinarily involved being of the order of one second to one minute or so to vary the amount of paper fiberization.

The contents of the hammer mill; that is, the resulting paper fibers are then put through a screen having openings or a mesh of about three-eighths of an inch. The fibers are the raw material of the present process and after screening are brought permanently into contact and useful interrelationship in either of two preferred fashions.

In one method the thermosetting plastic resin binder is intermixed with dry, fiberized waste paper. The resin and solvent solution (e.g. water) is sprayed or atomized with continuously stirred paper fibers so that the binder coats or impregnates the fibers. A suitable phenolic resin binder is produced by Reichhold Chemicals, Inc., and is known as "SW-1838 Forasite". Based on the weight of the paper fibers, there is taken an amount of the binder ranging from about 3% to about 35% thereof. The binder is mixed with a solvent (e.g. water) in about a one to one ratio; that is, about 50% binder and 50% solvent or water. The volatile (solvent) content is kept below about 18% of the weight of the paper, a drying step being used if necessary. Stated differently, the preferred proportions by weight are about 65% paper fibers, about 17% of solvent (water) and about 17% binder (resin). This relatively dry mixture is then set or pressed into a geometrical form suitable for a building block or an item of lumber or the like. The pressure ranges from about 5 to 600 psi, preferably a range within the limits of 25 to 500 psi. The press is arranged so that excess moisture can readily escape under the indicated pressure.

The formed shape, still under pressure, is subjected then to baking to set or cure the resin. A temperature range for baking from about 250°F to 375°F has been found suitable, although the temperature is preferably kept under 300°F. The duration of baking time or drying time is variable from about three minutes to about 30 minutes. In many cases and for most uses, it is appropriate to keep the baking time between about three minutes to about five minutes.

At the conclusion of the baking operation, the pressure is released, the temperature is reduced and the resulting firm shape is permitted to cool to atmospheric conditions. The result is a product which can be handled very much as is lumber or very much as are building blocks. The range of densities and the characteristics of the product are very much as they are described in the above-mentioned patent except that the treatment time, effort and expense are substantially less.

In another version of the improved process, we start with the same starting product; namely, waste paper which has been treated in a hammer mill and the resulting fibers have been submitted to a screening. The screened material is mixed with a thermosetting epoxy foaming resin, such as Minnesota Mining and Manufacturing Company's "Scotchcast 603" furnished as dry, free flowing particles. The paper fibers and binder are mixed together in proportions of about 400 grams of paper fibers to 50 grams of the binder. The moisture content of the paper fibers is about 7% by weight. In this instance no water or moisture is added. Other appropriate finely divided particles of thermoplastic or thermoset solid particle resins may be used in like manner in a relatively dry process.

The relatively dry mixture in the form of a geometrical shape is put under pressure ranging from about 5 psi to about 400 psi. The geometric shape under pressure then is baked under pressure at a temperature from about 350°F for a period of about three hours. Since the epoxy resin itself melts at about 175°F and somewhat expands as it melts, it is well cured at the higher temperature and penetrates and disburses excellently into and between the paper fibers during the baking operation.

When the baking has been completed, the pressure is released, the temperature is permitted to drop to room temperature, and the product is utilized as a building material or as a lumber-like component. In this instance also the product is at least equal to the product of the above-identified patent, but the time, expense and difficulty of the processing are greatly reduced.

What is claimed is:

1. A method of providing a structural shape comprising:
   a. introducing dry waste paper into an operating hammer mill to make dry paper fibers;
   b. withdrawing said dry paper fibers from said mill;
   c. passing said dry paper fibers through a screen;

d. mixing said dry paper fibers with a thermosetting resin binder in water in the proportion by weight of paper fibers of from about 3–35% water and from 3–35% binder;
e. pressing the mixture at a pressure of from 3–600 psi while permitting said water to escape, and;
f. heating said mixture while under said pressure to a temperature of 250°–375°F. for from three to thirty minutes to cure said resin binder and thereby form said structural shape.

2. The method of claim 1 wherein said resin binder is phenolic.

3. A method of providing a structural shape comprising:
a. introducing dry waste paper into an operating hammer mill to make dry paper fibers;
b. withdrawing said dry paper fibers from said mill;
c. passing said dry paper fibers through a screen;
d. mixing said dry paper fibers with a thermosetting resin foaming binder in dry form in the proportions by weight of about 400 grams of paper fiber and 50 grams of binder;
e. pressing the dry mixture at a pressure of 5–400 psi; and,
f. heating said mixture while under said pressure to a temperature of about 350°F. for three minutes to three hours to cure said resin binder and thereby form said structural shape.

4. The method of claim 3 wherein said resin binder is an epoxy resin in finely particulate form.

* * * * *